US010924890B2

(12) United States Patent
Camilo Da Silva et al.

(10) Patent No.: US 10,924,890 B2
(45) Date of Patent: Feb. 16, 2021

(54) DEVICE POLICY ENFORCEMENT

(71) Applicant: Hewlett-Packard Development Company, L.P., Spring, TX (US)

(72) Inventors: Juliano Camilo Da Silva, Porto Alegre (BR); Gustavo Kath, Porto Alegre (BR); Romulo Rosinha, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/481,192

(22) PCT Filed: Oct. 20, 2017

(86) PCT No.: PCT/US2017/057652
§ 371 (c)(1),
(2) Date: Jul. 26, 2019

(87) PCT Pub. No.: WO2019/078889
PCT Pub. Date: Apr. 25, 2019

(65) Prior Publication Data
US 2020/0196100 A1   Jun. 18, 2020

(51) Int. Cl.
*H04W 4/029* (2018.01)
*H04W 4/021* (2018.01)
*H04W 4/02* (2018.01)

(52) U.S. Cl.
CPC .......... *H04W 4/029* (2018.02); *H04W 4/021* (2013.01); *H04W 4/023* (2013.01)

(58) Field of Classification Search
CPC ......... H04W 4/00; H04W 4/02; H04W 4/021; H04W 4/023; H04W 4/024; H04W 4/025; H04W 4/029; H04W 4/04; H04W 12/08; H04W 12/084; H04W 12/0013; H04W 12/00503; H04W 12/0806
See application file for complete search history.

(56) References Cited

U.S. PATENT DOCUMENTS

| 9,111,111 | B1 | 8/2015 | Ramaswamy |
| 9,113,344 | B1* | 8/2015 | Lee ................ H04W 64/00 |
| 9,386,415 | B2 | 7/2016 | Li et al. |

(Continued)

OTHER PUBLICATIONS

Use Geofencing to Actively Keep Track of your Devices,. Jan 30, 2017.

*Primary Examiner* — Jean A Gelin
(74) *Attorney, Agent, or Firm* — Tong, Rea, Bentley & Kim LLC (57) ABSTRACT

Example implementations relate to device policy enforcement. In some examples, a computing device may comprise a processing resource and a memory resource storing machine readable instructions to determine when a location of a mobile device is within a geofence using global positioning system (GPS) coordinates received from the mobile device defining a location of the mobile device, determine when a distance of the computing device from the mobile device is within a threshold distance of the mobile device using proximity data received via a network relationship, and enforce a policy definition included in a computing device policy definition received from an external computing device based on the location of the mobile device and the distance of the computing device from the mobile device.

15 Claims, 4 Drawing Sheets

(56) References Cited

U.S. PATENT DOCUMENTS

| | | | |
|---|---|---|---|
| 9,444,805 B1* | 9/2016 | Saylor | H04W 4/029 |
| 9,741,191 B1* | 8/2017 | Wong | G06Q 30/0261 |
| 9,788,153 B1* | 10/2017 | Newstadt | G06F 3/1219 |
| 10,304,043 B1* | 5/2019 | Nguyen | G06Q 20/20 |
| 10,397,734 B2* | 8/2019 | Anderson | H04W 4/025 |
| 10,438,185 B1* | 10/2019 | Shearer | G06Q 20/02 |
| 2013/0093627 A1* | 4/2013 | Cosman | G01S 19/34 |
| | | | 342/451 |
| 2013/0174223 A1 | 7/2013 | Dykeman et al. | |
| 2013/0225282 A1* | 8/2013 | Williams | G07F 17/3241 |
| | | | 463/29 |
| 2013/0326137 A1* | 12/2013 | Bilange | H04L 67/289 |
| | | | 711/113 |
| 2013/0340033 A1 | 12/2013 | Jones et al. | |
| 2013/0347058 A1* | 12/2013 | Smith | G06F 21/57 |
| | | | 726/1 |
| 2014/0062695 A1* | 3/2014 | Rosen | G08B 21/0219 |
| | | | 340/539.13 |
| 2014/0208397 A1* | 7/2014 | Peterson | H04W 4/021 |
| | | | 726/4 |
| 2014/0274225 A1* | 9/2014 | Lacatus | H04W 52/0251 |
| | | | 455/574 |
| 2014/0359777 A1* | 12/2014 | Lam | H04W 12/0027 |
| | | | 726/25 |
| 2015/0089673 A1 | 3/2015 | Beckman et al. | |
| 2015/0105944 A1* | 4/2015 | Louboutin | H04W 64/003 |
| | | | 701/2 |
| 2015/0229626 A1 | 8/2015 | Hauhn | |
| 2015/0278539 A1 | 10/2015 | Scarasso | |
| 2016/0150365 A1* | 5/2016 | Brown | H04W 12/0013 |
| | | | 455/410 |
| 2016/0306993 A1 | 10/2016 | Sand-Soll | |
| 2016/0330197 A1* | 11/2016 | Barillaud | H04W 12/0808 |
| 2017/0011425 A1 | 1/2017 | Proctor et al. | |
| 2017/0034218 A1* | 2/2017 | Rasband | H04W 4/50 |
| 2017/0068568 A1* | 3/2017 | Desai | G06F 9/468 |
| 2017/0251390 A1* | 8/2017 | Gold | G01R 21/133 |
| 2017/0353829 A1* | 12/2017 | Kumar | G08B 21/24 |
| 2019/0373405 A1* | 12/2019 | Jones | H04L 61/35 |

* cited by examiner

DEVICE POLICY ENFORCEMENT

BACKGROUND

Computing devices may be used by multiple users in a closed space. For example, computing devices may be shared between multiple users in an office environment.

Computing devices may be constrained to the closed space for use by multiple users. The computing devices may be kept in the closed space for security reasons.

DETAILED DESCRIPTION

A computing device may be constrained to a closed space for security reasons. As used herein, the term "computing device" can, for example, refer to a laptop computer, a desktop computer, or a mobile device (e.g., a smart phone, tablet, personal digital assistant, smart glasses, a wrist-worn device, etc.), among other types of computing devices.

For example, multiple users may use a laptop in an office environment. The laptop may be constrained to a specified geospatial location, such as the office environment.

The computing device may be constrained to a geospatial location for security reasons utilizing geofencing techniques. As used herein, the term "geofence" can, for example, refer to a virtual perimeter for a real-world geographic area. For example, the geofence can be a virtual perimeter of a real-world office environment, such as an office building. In some examples, the geofence can be defined by global positioning system (GPS) coordinates.

Utilizing geofencing, a computing device can be constrained to a geospatial location. In some situations, computing devices may not include a GPS system included with the computing device. For instance, some computing devices may not include an integrated GPS system due to costs associated with including an integrated GPS system. As a result, some computing devices may not be able to be constrained to the geospatial location via a geofence. As used herein, the term "GPS system" can, for example, refer to a global navigation satellite system that can provide geolocation and time information to a device that includes a GPS receiver. As used herein, the term "geolocation" can, for example, refer to a real-world geographic location of an object, which can, in some examples, be defined by a set of geographic coordinates such as latitude, longitude, and/or elevation.

Device policy enforcement, according to the disclosure, can allow for computing devices without GPS or other location based systems to be constrained to a particular geospatial location defined by a geofence. In some examples, the geofence may be defined by GPS coordinates provided to the computing device. A mobile device can be utilized to determine whether the computing device is within the geofence. As used herein, the term "mobile device" can, for example, refer to a phone (e.g., a smart phone), a tablet, a personal digital assistant (PDA), smart glasses, and/or a wrist-worn device (e.g., a smart watch), among other types of mobile devices. Based on the location of the computing device, the computing device can allow and/or restrict certain services to be run on the computing device utilizing the mobile device and based on policy definitions.

Figure 1:
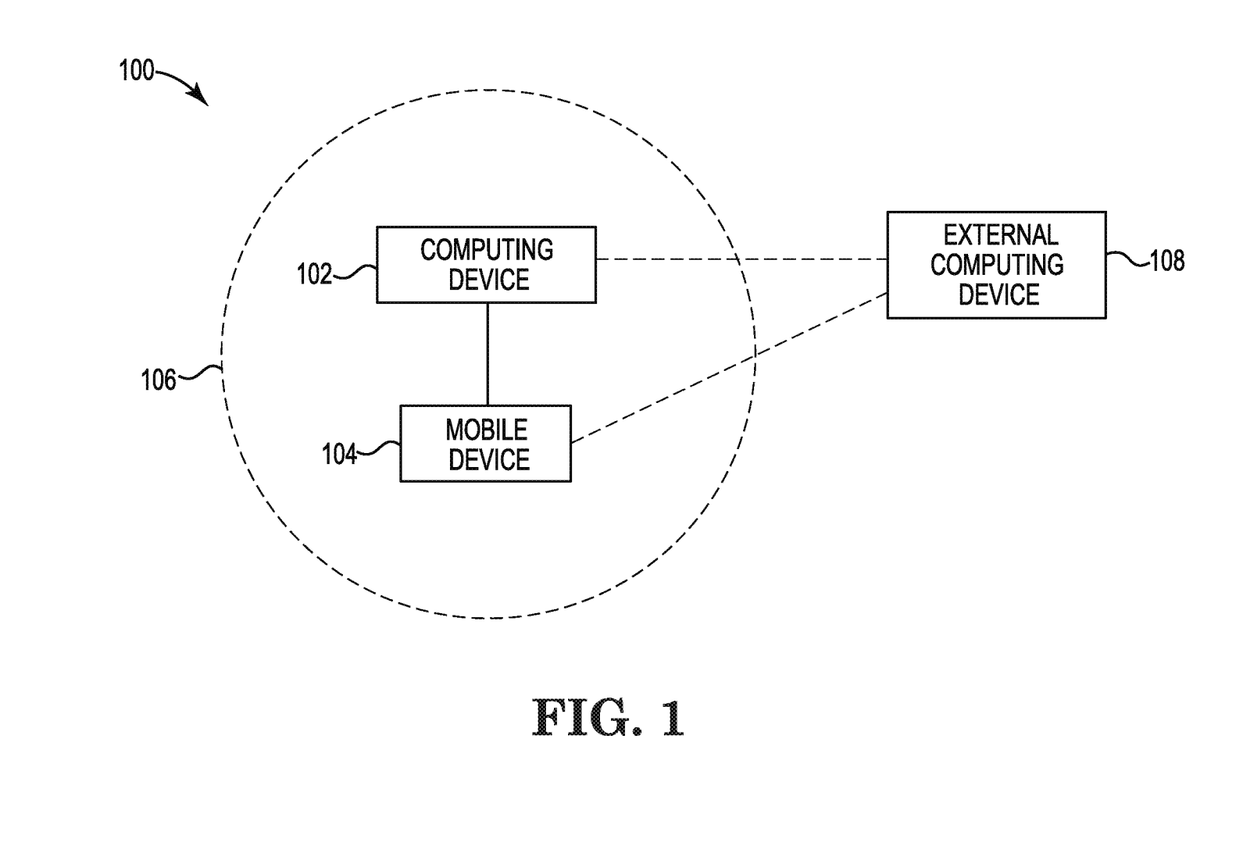
FIG. 1 illustrates an example of a system layout consistent with the disclosure.

FIG. 1 illustrates an example of a system layout 100 consistent with the disclosure. As illustrated in FIG. 1, the system layout 100 may include computing device 102, mobile device 104, geofence 106, and external computing device 108.

Computing device 102 can determine when a location of mobile device 104 is within geofence 106. For example, computing device 102 can determine when mobile device 104 is within a virtual perimeter of a geographic area, such as an office space, or area within an office space.

Computing device 102 can determine when the location of mobile device 104 is within geofence 106 using GPS coordinates. As used herein, the term "GPS coordinates" can, for example, refer to geographic coordinates including latitude, longitude, and/or elevation, as well as time information. For example, mobile device 104 can transmit GPS coordinates corresponding to mobile device 104's location to computing device 102. Computing device 102 can compare the GPS coordinates corresponding to mobile device 104's location to different GPS coordinates defining geofence 106.

Although geofence 106 is illustrated in FIG. 1 as being circular, examples of the disclosure are not so limited. For example, geofence 106 can be other shapes, such as an oval, square, rectangle, combinations thereof, or any other shape.

The different GPS coordinates defining geofence 106 can be included in a computing device policy definition received from external computing device 108. As used herein, the term "computing device policy definition" can, for example, refer to a policy definition that can cause particular application instructions to be executed and/or prevent particular application instructions from being executed. As used herein, the term "application instructions" can, for example, refer to machine readable instructions to cause a processing resource to perform an operation.

For example, the computing device policy definition received from external computing device 108 can include the different GPS coordinates defining geofence 106 such that computing device 102 can determine whether the location of mobile device 104 is within geofence 106. The computing device policy definition may also include a security policy definition and a threshold distance of computing device 102 from mobile device 104, as is further described herein.

External computing device 108 can be a computing device that is connected to computing device 102 and/or mobile device 104 via a network relationship. External computing device 108 can, for example, be an external server.

Although the computing device policy definition is described above as being received by computing device 102 from external computing device 108, examples of the disclosure are not so limited. For example, mobile device 104 can receive the computing device policy definition from external computing device 108, and transmit the computing device policy definition to computing device 102. In other words, computing device 102 can receive the computing device policy definition from mobile device 104.

Based on the comparison of the GPS coordinates indicating the location of mobile device 104 and the different GPS coordinates defining geofence 106, computing device 102 can determine whether mobile device 104 is within geofence 106. For example, if the GPS coordinates corresponding to the location of mobile device 104 indicate mobile device 104 is outside of the different GPS coordinates defining geofence 106, computing device 102 can determine mobile device 104 is outside geofence 106. Correspondingly, if the GPS coordinates corresponding to the location of mobile device 104 indicate mobile device 104 is inside of the different GPS coordinates defining geofence 106, computing device 102 can determine mobile device 104 is within geofence 106.

Computing device 102 can determine when a distance of computing device 102 is within a threshold distance of mobile device 104 using proximity data received from mobile device 104 via a network relationship. The network relationship can be a wired or wireless network. Examples of such a network relationship can include a local area network (LAN), wide area network (WAN), personal area network (PAN), a distributed computing environment (e.g., a cloud computing environment), storage area network (SAN), Metropolitan area network (MAN), a cellular communications network, Bluetooth, and/or the Internet, among other types of network relationships.

For example, computing device 102 and mobile device 104 can be connected via a Bluetooth connection. Mobile device 104 can transmit proximity data to computing device 102 via the Bluetooth connection. As used herein, the term "proximity data" can, for example, refer to data indicating a spatial proximity between computing device 102 and mobile device 104. The proximity data can be received by computing device 102. Computing device 102 can determine a distance between computing device 102 and mobile device 104 using the proximity data.

In some examples, proximity data can include a received signal strength indication (RSSI) value. For example, mobile device 104 can transmit an RSSI value to computing device 102. The RSSI value can correspond to a distance between computing device 102 and mobile device 104. Based on the value of the RSSI value, computing device 102 can determine the distance between computing device 102 and mobile device 104.

Computing device 102 can compare the distance between computing device 102 and mobile device 104 to a threshold distance. Based on the comparison, computing device 102 can determine whether computing device 102 is within the threshold distance of mobile device 104. For example, computing device 102 can determine the distance between computing device 102 and mobile device 104 is five meters. Computing device 102 can compare the five meter distance between computing device 102 and mobile device 104 to a threshold distance of ten meters. Based on the comparison, computing device 102 can determine computing device 102 is within the threshold distance of mobile device 104.

The threshold distance can be included in a computing device policy definition received from external computing device 108. For example, the computing device policy definition received from external computing device 108 can include the threshold distance such that computing device 102 can determine whether computing device 102 is within the threshold distance of mobile device 104.

The computing device policy definition can include a security policy definition. As used herein, the term "security policy definition" can, for example, refer to a definition that can cause particular application instructions to be executed and/or prevent particular application instructions from being executed in order to prevent unauthorized use of computing device 102. For example, a security policy definition can prevent particular application instructions from being executed based on the location of computing device 102 and the distance of computing device 102 from mobile device 104 in order to prevent unauthorized use of computing device 102, as is further described herein.

The computing device policy definition can be a predefined policy definition. For example, a user, such as an IT administrator, may define a set of policies based on security policies.

Computing device 102 can enforce a policy definition included in the computing device policy definition received from external computing device 108. As used herein, the term "policy definition" can, for example, refer to a definition that can cause particular application instructions to be executed and/or prevent particular application instructions from being executed. Computing device 102 can enforce the policy definition based on the location of mobile device 104 relative to geofence 106 and/or the distance of computing device 102 from mobile device 104. As an example, the computing device policy definition can include different GPS coordinates defining geofence 106 such as a latitude (e.g., −30.05963), a longitude (e.g., −51.17052), and a radius (e.g., 50 meters), a threshold distance (e.g., 10 meters), and a security policy definition (e.g., prevent a particular application from being executed).

In some examples, computing device 102 can enforce the policy definition in response to mobile device 104 being outside of geofence 106. For instance, computing device 102 can compare the GPS coordinates indicating the location of mobile device 104 and the different GPS coordinates defining geofence 106. Computing device 102 can determine, based on the GPS coordinates indicating the location of mobile device 104 as outside of geofence 106, that mobile device 104 is located outside of geofence 106. Based on mobile device 104 being outside of geofence 106, computing device 102 can enforce a policy definition, such as preventing particular application instructions from being executed (e.g., prevent C:\Program Files\Git\git-bash.exe from running).

In some examples, computing device 102 can enforce the policy definition in response to computing device 102 being beyond the threshold distance from mobile device 104. For instance, computing device 102 can utilize proximity data received from mobile device 104 to determine a distance between computing device 102 and mobile device 104. Computing device 102 can compare the distance between computing device 102 and mobile device 104 to a threshold distance. Based on the comparison, computing device 102 can determine that computing device 102 is beyond the threshold distance from mobile device 104. Based on computing device 102 being beyond the threshold distance from mobile device 104, computing device 102 can enforce a policy definition, such as preventing particular application instructions from being executed (e.g., prevent C:\Program Files\Git\git-bash.exe from running).

In some examples, computing device 102 can enforce the policy definition in response to mobile device 104 being outside of geofence 106 and computing device 102 being beyond the threshold distance from mobile device 104. For example, based on mobile device 104 being outside of geofence 106 and computing device 102 being beyond the threshold distance from mobile device 104, computing device 102 can enforce a policy definition, such as preventing particular application instructions from being executed (e.g., prevent C:\Program Files\Git\git-bash.exe from running).

In some examples, computing device 102 can enforce the policy definition in response to mobile device 104 being outside of geofence 106 for a threshold amount of time, computing device 102 being beyond the threshold distance from mobile device 104 for a threshold amount of time, and/or both mobile device 104 being outside of geofence 106 and computing device 102 being beyond the threshold distance from mobile device 104 for a threshold amount of time. The threshold amount of time can be included in the computing device policy definition. For example, computing device 102 can enforce the policy definition in response to mobile device 104 being outside of geofence 106 for 120 seconds, computing device 102 being beyond the threshold distance from mobile device 104 for 120 seconds, and/or both mobile device 104 being outside of geofence 106 and computing device 102 being beyond the threshold distance from mobile device 104 for 120 seconds.

In some examples, the threshold amounts of time can be different. For example, computing device 102 can enforce the policy definition in response to mobile device 104 being outside of geofence 106 for a first threshold amount of time. Computing device 102 can enforce the policy definition in response to computing device 102 being beyond the threshold distance from mobile device 104 for a second threshold amount of time.

Computing device 102 can transmit a notification to mobile device 104 and/or external computing device 108 in response to preventing particular application instructions from being executed. In other words, computing device 102 can transmit a notification to mobile device 104 and/or external computing device 108 in response to computing device 102 enforcing a policy definition included in the computing device policy definition.

The notification can allow a user of mobile device 104 and/or external computing device 108 to be notified that mobile device 104, and correspondingly, computing device 102, may have been taken out of geofence 106. The user may be notified and can take precautionary action, such as notifying a user of mobile device 104 and/or computing device 102.

Computing device 102 can receive a revised computing device policy definition from external computing device 108. For example, an IT administrator may decide to modify the different GPS coordinates defining geofence 106, modify the threshold distance of computing device 102 from mobile device 104, modify the threshold amount of time mobile device 104 is outside of geofence 106 and/or the threshold amount of time computing device 102 is beyond the threshold distance from mobile device 104, among other revised computing device policy definitions. The revised computing device policy definitions can be transmitted to computing device 102 directly from external computing device 108, or to computing device 102 via mobile device 104.

Computing device 102 can request a revised computing device policy definition at predetermined intervals from external computing device 108. For example, computing device 102 can request the revised computing device policy definition from external computing device 108 every 60 seconds, although examples of the disclosure are not limited to 60 seconds. For example, computing device 102 can request the revised computing device policy definition from external computing device 108 more or less frequently than every 60 seconds.

Computing device 102 can receive the revised computing device policy definition in response to the request for the revised computing device policy definition from external computing device 108. The revised computing device policy definition can be received by computing device 102 directly from external computing device 108, or via mobile device 104.

Device policy enforcement according to the disclosure can allow a computing device to determine its location using GPS coordinates of a mobile device. The computing device can enforce various policies based on the location of the computing device relative to the mobile device. Device policy enforcement can allow for location based security of a computing device without the computing device including GPS functionality. This can allow for lower cost location based security that can be compatible with existing infrastructure.

Figure 2:
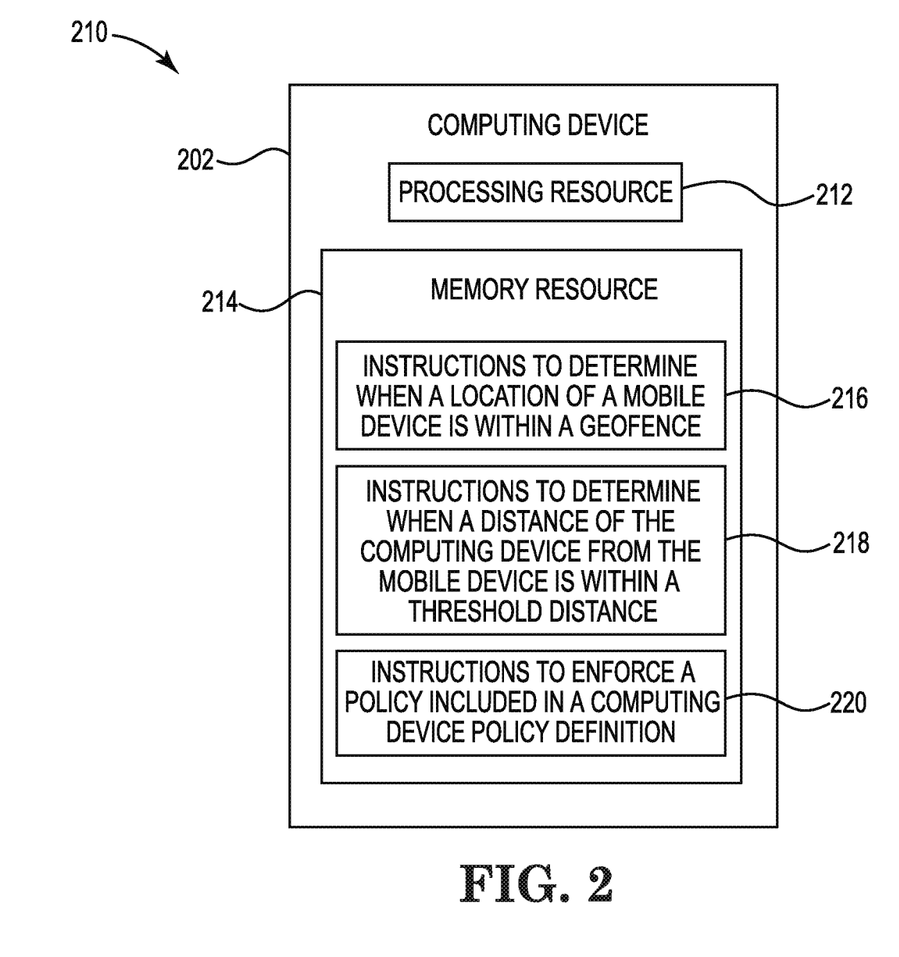
FIG. 2 is a block diagram of an example of a computing device utilized in device policy enforcement consistent with the disclosure.

FIG. 2 is a block diagram 210 of an example of a computing device 202 utilized in device policy enforcement consistent with the disclosure. As described herein, the computing device 202 (e.g., computing device 102, previously described in connection with FIG. 1) may perform a function related to device policy enforcement. Although not illustrated in FIG. 2, the computing device 202 may include a machine-readable storage medium. Although the following descriptions refer to an individual processing resource and an individual machine readable storage medium, the descriptions may also apply to a system with multiple processing resources and multiple machine readable storage mediums. In such examples, the computing device 202 may be distributed across multiple machine readable storage mediums and the computing device 202 may be distributed across multiple processing resources. Put another way, the instructions executed by the computing device 202 may be stored across multiple machine-readable storage mediums and executed across multiple processing resources, such as in a distributed or virtual computing environment.

As illustrated in FIG. 2, the computing device 202 may comprise a processing resource 212, and a memory resource 214 storing machine readable instructions to cause the processing resource 212 to perform an operation relating to device policy enforcement. That is, using the processing resource 212 and the memory resource 214, the computing device 202 may enforce a policy definition, among other operations. Processing resource 212 may be a central processing unit (CPU), microprocessor, and/or other hardware device suitable for retrieval and execution of instructions stored in memory resource 214.

The computing device 202 may include instructions 216 stored in the memory resource 214 and executable by the processing resource 212 to determine when a location of a mobile device is within a geofence. For example, computing device 202 may include instructions 216 stored in the memory resource 214 and executable by the processing resource 212 to determine when a location of a mobile device is within a geofence using GPS coordinates received from the mobile device defining a location of the mobile device. For example, the geofence can be defined by different GPS coordinates, and the GPS coordinates of the mobile device can be compared to the different GPS coordinates defining the geofence. Based on the comparison, computing device 202 can determine when the mobile device is within the geofence or outside the geofence. Since the location of the mobile device can correspond to the location of computing device 202, the computing device 202 may, correspondingly, determine the computing device 202 is within the geofence or outside the geofence.

The computing device 202 may include instructions 218 stored in the memory resource 214 and executable by the processing resource 212 to determine when a distance of the computing device 202 from the mobile device is within a threshold distance. For example, computing device 202 may include instructions 218 stored in the memory resource 214 and executable by the processing resource 212 to determine when a distance of the computing device 202 from the mobile device is within a threshold distance of the mobile device using proximity data received by computing device 202 via a network relationship. For example, computing device 202 can compare a distance between computing device 202 and the mobile device to a threshold distance. Based on the comparison, computing device 202 can determine whether computing device 202 is within the threshold distance of the mobile device.

The computing device 202 may include instructions 220 stored in the memory resource 214 and executable by the processing resource 212 to enforce a policy included in a computing device policy definition. For example, computing device 202 may include instructions 220 stored in the memory resource 214 and executable by the processing resource 212 to enforce a policy definition included in a computing device policy definition received from an external computing device based on the location of the computing device 202 and the distance of the computing device 202 from the mobile device. In some examples, computing device 202 can enforce the computing device policy definition in response to the location of the mobile device (and, correspondingly, the location of the computing device) being outside the geofence. In some examples, computing device 202 can enforce the computing device policy definition in response to computing device 202 being beyond the threshold distance from the mobile device. In some examples, computing device 202 can enforce the computing device policy in response to the location of the mobile device (and, correspondingly, the location of the computing device) being outside the geofence and computing device 202 being beyond the threshold distance from the mobile device.

In this manner, the computing device 202 may determine when a location of a mobile device is within a geofence, determine when a distance of computing device 202 from the mobile device is within a threshold distance, and to enforce a policy included in a computing device policy definition.

Figure 3:
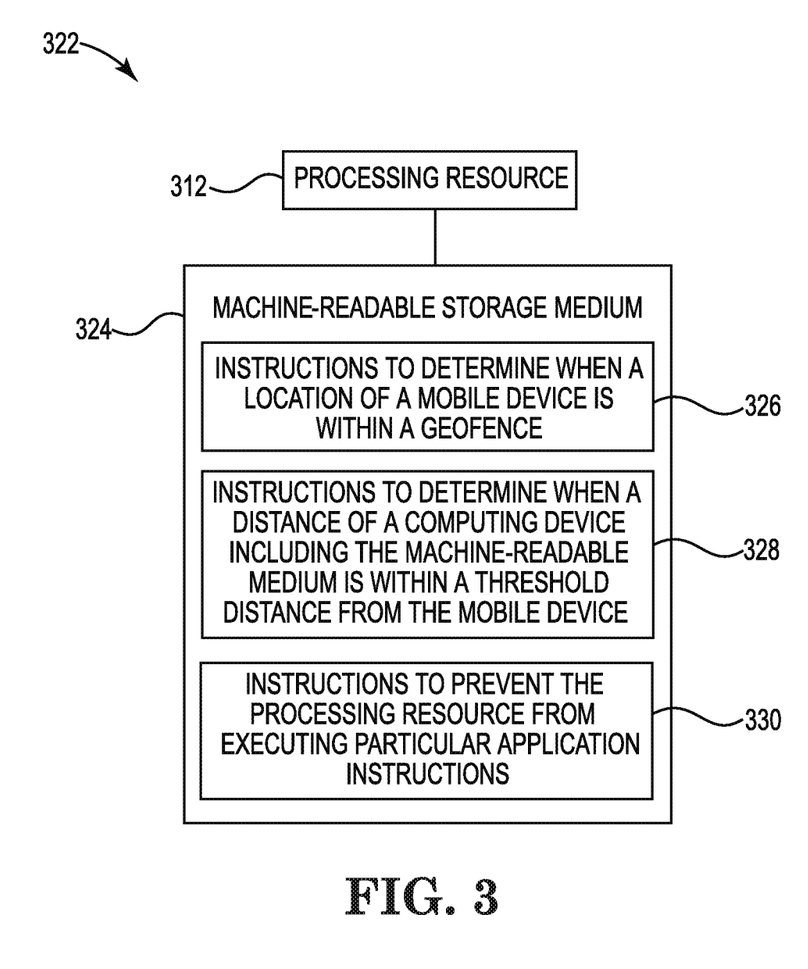
FIG. 3 is a block diagram of an example of a system consistent with the disclosure.

FIG. 3 is a block diagram of an example of a system 322 consistent with the disclosure. In the example of FIG. 3, system 322 includes a processing resource 312 (e.g., processing resource 212, previously described in connection with FIG. 2) and a machine readable storage medium 324. Although the following descriptions refer to an individual processing resource and an individual machine-readable storage medium, the descriptions may also apply to a system with multiple processing resources and multiple machine-readable storage mediums. In such examples, the instructions may be distributed across multiple machine-readable storage mediums and the instructions may be distributed across multiple processing resources. Put another way, the instructions may be stored across multiple machine-readable storage mediums and executed across multiple processing resources, such as in a distributed computing environment.

Processing resource 312 may be a central processing unit (CPU), microprocessor, and/or other hardware device suitable for retrieval and execution of instructions stored in machine readable storage medium 324. In the particular example shown in FIG. 3, processing resource 312 may receive, determine, and send instructions 326, 328, and 330. As an alternative or in addition to retrieving and executing instructions, processing resource 312 may include an electronic circuit comprising an electronic component for performing the operations of the instructions in machine readable storage medium 324. With respect to the executable instruction representations or boxes described and shown herein, it should be understood that part or all of the executable instructions and/or electronic circuits included within one box may be included in a different box shown in the figures or in a different box not shown.

Machine readable storage medium 324 may be any electronic, magnetic, optical, or other physical storage device that stores executable instructions. Thus, machine readable storage medium 324 may be, for example, Random Access Memory (RAM), an Electrically-Erasable Programmable Read-Only Memory (EEPROM), a storage drive, an optical disc, and the like. The executable instructions may be "installed" on the system 322 illustrated in FIG. 3. Machine readable storage medium 324 may be a portable, external or remote storage medium, for example, that allows the system 322 to download the instructions from the portable/external/remote storage medium. In this situation, the executable instructions may be part of an "installation package". As described herein, machine readable storage medium 324 may be encoded with executable instructions related to antenna polarization patterns.

Instructions 326 to determine when a location of a mobile device is within a geofence, when executed by processing resource 312, may cause system 322 to determine when a location of a mobile device is within a geofence using GPS coordinates received from the mobile device that define a location of the mobile device. The geofence can be defined by different GPS coordinates. The GPS coordinates of the mobile device can be compared to the different GPS coordinates defining the geofence and based on the comparison, the system 322 can determine when the mobile device is within the geofence or outside the geofence.

Instructions 328 to determine when a distance of a computing device including the machine readable medium is within a threshold distance from the mobile device, when executed by processing resource 312, may cause system 322 to determine when a distance of a computing device including the machine readable medium 324 is within a threshold distance from the mobile device using proximity data to the mobile device received from the mobile device via a network relationship. For example, a distance between a computing device including machine readable storage medium 324 and the mobile device can be compared to a threshold distance. Based on the comparison, system 322 can determine whether the computing device including machine readable storage medium 324 is within the threshold distance of the mobile device.

Instructions 330 to prevent the processing resource 312 from executing particular application instructions, when executed by processing resource 312, may cause system 322 to prevent, in response to the mobile device being outside of the geofence and/or the computing device being beyond the threshold distance, the processing resource 312 from executing particular application instructions included in a computing device policy definition received from an external computing device. In some examples, system 322 can prevent the processing resource 312 from executing particular application instructions in response to the mobile device being outside of the geofence and/or the computing device being beyond the threshold distance for a threshold period of time.

Figure 4:
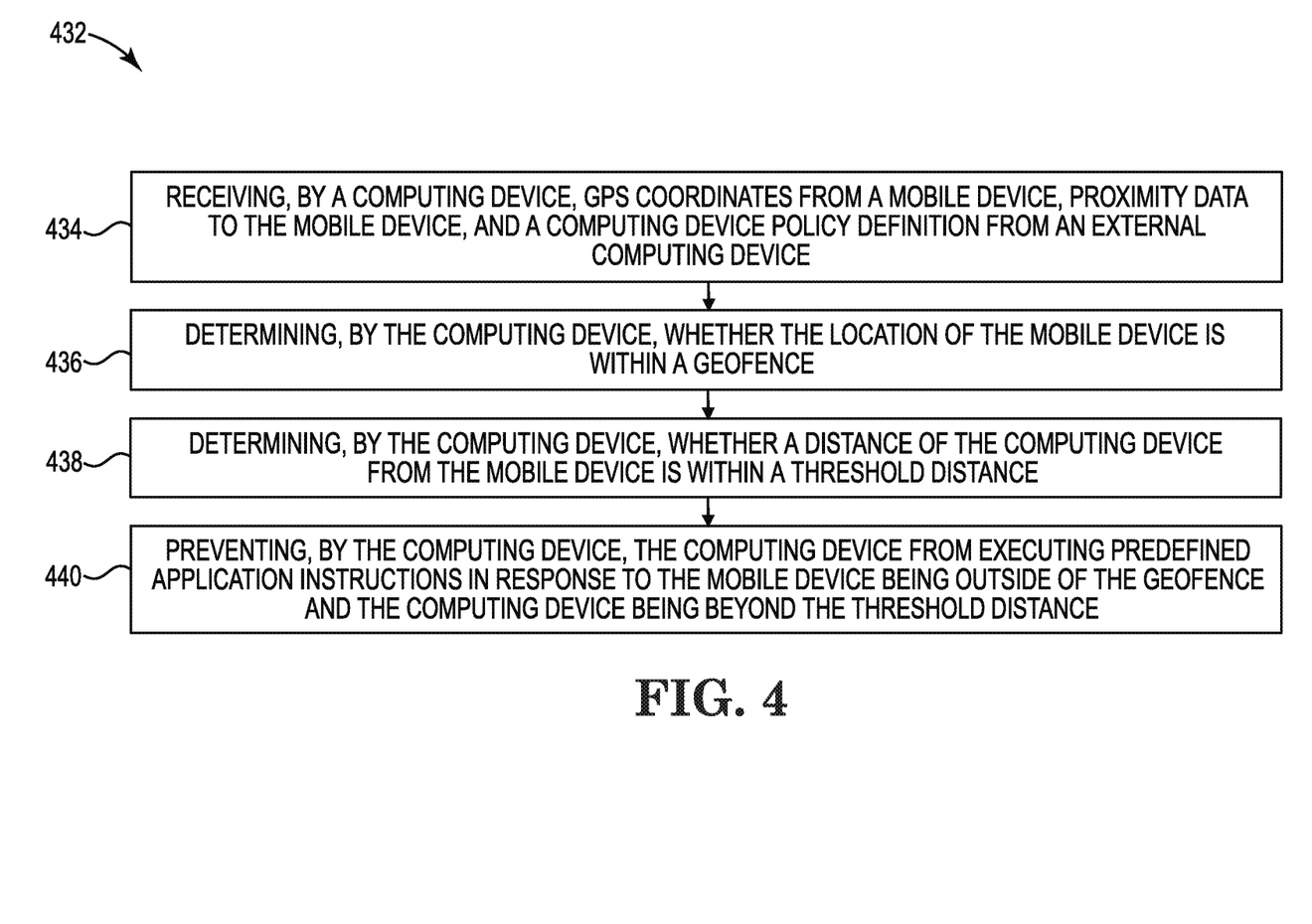
FIG. 4 illustrates an example of a method consistent with the disclosure.

FIG. 4 illustrates an example of a method 432 consistent with the disclosure. Method 432 may be performed by a computing device (e.g., computing device 102, 202, described in connection with FIGS. 1 and 2, respectively).

At 434, the method 432 may include receiving, by a computing device, GPS coordinates from a mobile device, proximity data to the mobile device, and a computing device policy definition from an external computing device. The computing device policy definition can include, for example, different GPS coordinates defining a geofence, a security policy definition, a threshold distance of the computing device from the mobile device, etc.

At 436, the method 432 may include determining, by the computing device, whether the location of the mobile device is within a geofence. For example, the computing device can determine whether the location of the mobile device is within a geofence defined by the different GPS coordinates included in the computing device policy definition. The computing device can compare the GPS coordinates received from the mobile device with the different GPS coordinates defining the geofence to determine whether the mobile device is within the geofence.

At 438, the method 432 may include determining, by the computing device, whether a distance of the computing device from the mobile device is within a threshold distance. For example, the computing device can determine whether the distance of the computing device from the mobile device is within a threshold distance from the mobile device. The threshold distance can be included in the computing device policy definition. The distance of the computing device from the mobile device can be determined using proximity data received by the computing device from the mobile device.

At 440, the method 432 can include preventing, by the computing device, the computing device from executing predefined application instructions in response to the mobile device being outside of the geofence and the computing device being beyond the threshold distance. The computing device can prevent the predefined application instructions from being executed based on the mobile device being outside the geofence and the computing device being beyond the threshold distance from the mobile device for a threshold amount of time.

Method 432 may include requesting, by the computing device, a revised computing device policy definition. The computing device can request a revised computing device policy definition at predetermined intervals from an external computing device. For example, the computing device can request a revised computing device policy definition every 120 seconds, more frequently than every 120 seconds, or less frequently than every 120 seconds.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure.

The figures herein follow a numbering convention in which the first digit corresponds to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2. Elements shown in the various figures herein can be added, exchanged, and/or eliminated so as to provide a plurality of additional examples of the disclosure. In addition, the proportion and the relative scale of the elements provided in the figures are intended to illustrate the examples of the disclosure, and should not be taken in a limiting sense. Further, as used herein, "a plurality of" an element and/or feature can refer to more than one of such elements and/or features.

What is claimed:

1. A computing device, comprising:
   a processing resource; and
   a memory resource storing machine readable instructions to cause the processing resource to:
   determine when a location of a mobile device is within a geofence using global positioning system (GPS) coordinates received from the mobile device defining a location of the mobile device;
   determine a distance between the computing device and the mobile device using proximity data received via a network relationship;
   determine whether the computing device is within a threshold distance of the mobile device based on the distance between the computing device and the mobile device; and
   enforce a policy definition included in a computing device policy definition received from an external computing device based on the location of the mobile device and the distance of the computing device from the mobile device.

2. The computing device of claim 1, wherein the policy definition included in the computing device policy definition is a security policy definition.

3. The computing device of claim 1, wherein the computing device policy definition includes different GPS coordinates defining the geofence.

4. The computing device of claim 3, wherein determining whether the location of the computing device is within the geofence includes comparing the GPS coordinates received from the mobile device with the different GPS coordinates defining the geofence.

5. The computing device of claim 1, wherein the computing device policy definition includes the threshold distance from the mobile device.

6. The computing device of claim 1, wherein enforcing the policy definition includes preventing the computing device from executing particular application instructions in response to the mobile device being outside of the geofence.

7. The computing device of claim 1, wherein enforcing the policy definition includes preventing the computing device from executing particular application instructions in response to the computing device being beyond the threshold distance.

8. A non-transitory machine readable medium having stored thereon machine readable instructions to cause a processing resource to:
   determine when a location of a mobile device is within a geofence using global positioning system (GPS) coordinates received from the mobile device that define a location of the mobile device;
   determine a distance between a computing device including the machine readable medium and the mobile device using proximity data to the mobile device received via a network relationship from the mobile device;
   determine whether the computing device is within a threshold distance of the mobile device based on the distance between the computing device and the mobile device; and
   prevent, in response to at least one of the mobile device being outside of the geofence and the computing device being beyond the threshold distance, the processing resource from executing particular application instructions included in a computing device policy definition received from an external computing device.

9. The medium of claim 8, comprising instructions to prevent the processing resource from executing the particular application instructions in response to at least one of the mobile device being outside of the geofence and the computing device being beyond the threshold distance for a threshold amount of time.

10. The medium of claim 8, wherein the computing device policy definition is a predefined policy definition.

11. The medium of claim 8, comprising instructions to transmit a notification to at least one of the mobile device and the external computing device in response to preventing the processing resource from executing the particular application instructions.

12. The medium of claim 8, comprising instructions to receive a revised computing device policy definition from the external computing device.

13. A method, comprising:
receiving, by a computing device:
global positioning coordinates (GPS) from a mobile device;
proximity data to the mobile device received via a network relationship; and
a computing device policy definition from an external computing device;
determining, by the computing device:
a distance between the computing device and the mobile device using the proximity data;
whether the location of the mobile device is within a geofence defined by different GPS coordinates included in the computing device policy definition using the GPS coordinates received from the mobile device; and
whether the computing device is within a threshold distance of the mobile device included in the computing device policy definition based on the distance between the computing device and the mobile device; and
preventing, by the computing device, the computing device from executing predefined application instructions included in the computing device policy definition in response to the mobile device being outside of the geofence and the computing device being beyond the threshold distance.

14. The method of claim 13, wherein the method includes requesting, by the computing device, a revised computing device policy definition at predetermined intervals from the external computing device.

15. The method of claim 14, wherein the method includes receiving the revised computing device policy definition in response to the requesting, by the computing device, the revised computing device policy definition from the external computing device.

* * * * *